United States Patent [19]

Meyers

[11] Patent Number: 4,873,043

[45] Date of Patent: Oct. 10, 1989

[54] METHOD INJECTION MOLDED A PLASTIC PART WITH A ROUND TUBULAR PORTION

[75] Inventor: Marvin L. Meyers, Erie, Pa.

[73] Assignee: Hoover Universal, Inc., Ann Arbor, Mich.

[21] Appl. No.: 173,145

[22] Filed: Mar. 25, 1988

[51] Int. Cl.[4] ............................................. B29C 45/40
[52] U.S. Cl. ................................ 264/237; 264/328.1; 264/336
[58] Field of Search ............ 264/237, 236, 230, 328.1, 264/334, 336, 342 R, 347, 348

[56] References Cited

U.S. PATENT DOCUMENTS 4,705,657 11/1987 Poulin ............................. 264/342 R
4,709,757 12/1987 Bly ..................................... 264/336

Primary Examiner—Jan H. Silbaugh
Assistant Examiner—Jill L. Heitbrink
Attorney, Agent, or Firm—Harness, Dickey & Pierce

[57] ABSTRACT

A process for forming a plastic part having a tubular portion that is continuous and without an flash/mismatch due to mold parting lines in which an injection mold is provided having a cavity formed with a cylindrical surface portion and a core member removably inserted endwise into the cylindrical portion. A molten plastic material is injected into the cavity so that it extends into the cylindrical portion and around the core member. The core member is then withdrawn in an axial direction from the cylindrical portion after the plastic material therein has solidified enough to retain its tubular shape but before it has completely to thereby enable the plastic material to shrink radially inwardly away from the cylindrical surface. Thereafter, the molded tubular shape and the cylindrical mold surface are moved relative to each other in an axial direction so that they are moved away from each other and the tubular portion is withdrawn from the mold, with the tubular portion yielding or flexing to whatever extent is necessary in order to clear the mold. The inner surface of the tubular portion is formed with a symmetrical discontinuous inner surface to insure even shrinking of the tubular portion during cooling and thereby insure roundness of the tubular portion of the molded part.

1 Claim, 4 Drawing Sheets

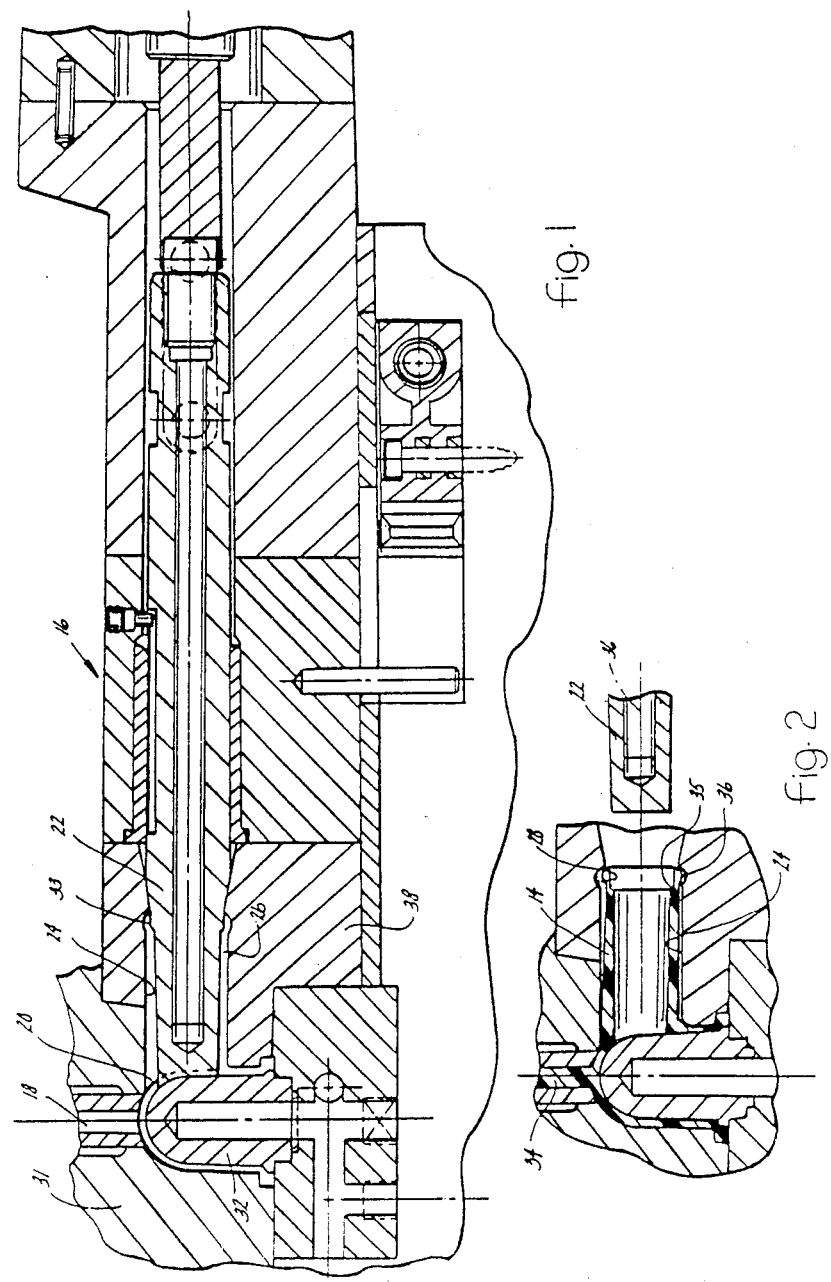

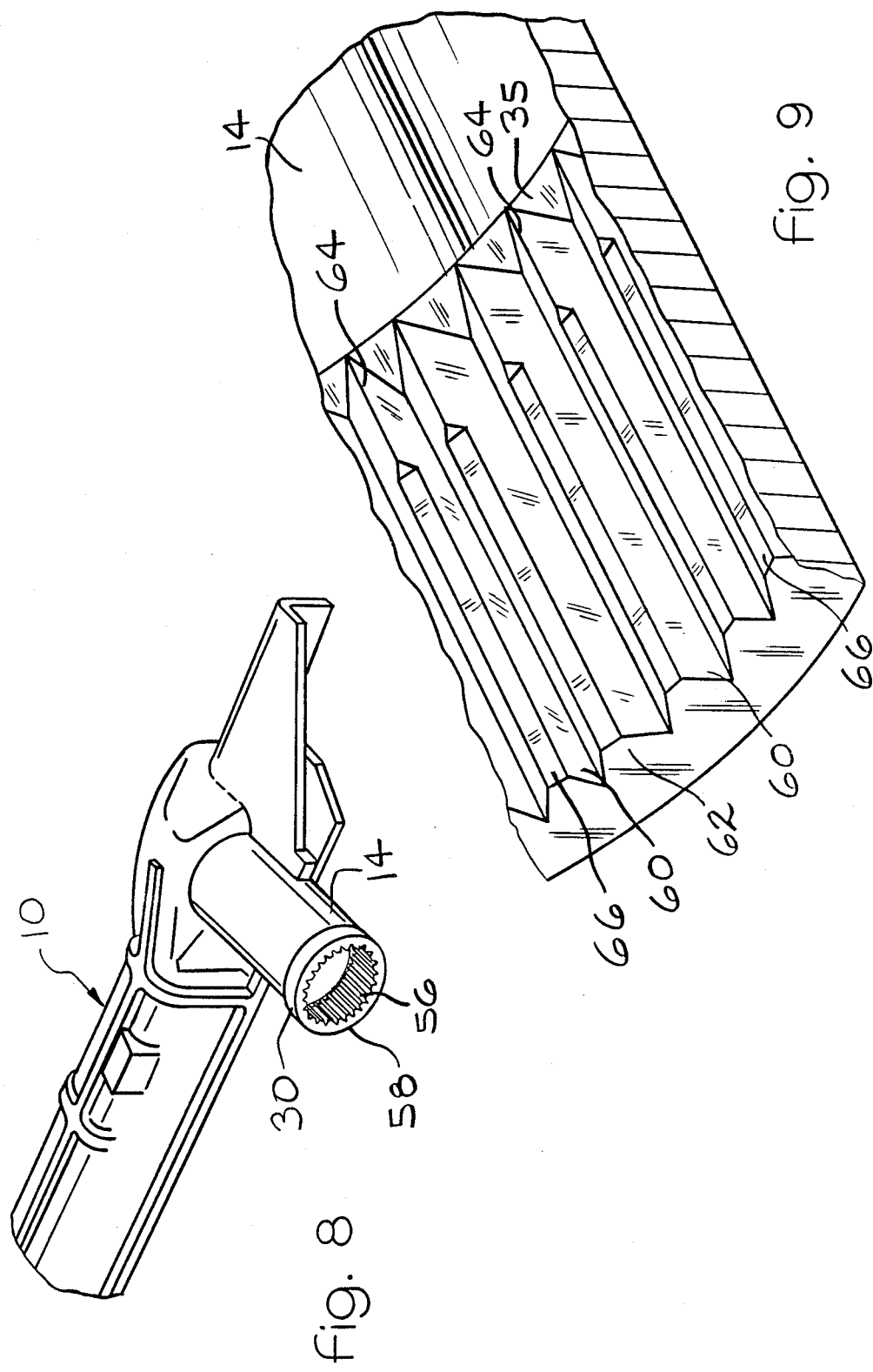

METHOD INJECTION MOLDED A PLASTIC PART WITH A ROUND TUBULAR PORTION

BACKGROUND OF THE INVENTION

This invention relates generallly to injection molded plastic parts such as the inlet or outlet portion of an automobile radiator which includes one or more tubular portions on which the hoses for circulating coolant through the radiator are mounted; and more particularly to the molding of such a part so that the roundness of the tubular portions are maintained. The present invention is thus an improvement on the invention disclosed in U.S. Pat. No. 4,709,757 assigned to the assignee of this application. Prior to the invention in U.S. Pat. No. 4,709,757, such parts were molded utilizing mold sections that are moved toward and away from each other resulting in a parting line between the mold sections. The result is a formation of "flash/mismatch" on the tubular portions of the radiator part on which the hoses are mounted. Flash results from the plastic being molded coming out between the parting lines of the mold, and mismatch is excess plastic on the molded part resulting from mold parts which are not in exact alignment. The result is undesirable and excess plastic on the molded part which is herein referred to as "flash/mismatch".

During use of the mold, the resulting flash/mismatch becomes increasingly significant and the molded parts become more and more prone to leakage when hoses are mounted thereon. The result is an unsatisfactory situation from the standpoint of keeping the hoses mounted on the radiator part without damage or leakage in this area.

The invention in U.S. Pat. No. 4,709,757 provides an improved method for forming parts of this type in which the parting lines on the tubular portions are avoided to thereby avoid the possibility of damage or leakage in this area. The present invention has this advantage and in addition insures the roundness of the tubular portions.

SUMMARY OF THE INVENTION

The method of this invention enables forming a plastic part having a tubular portion with a radially enlarged lip at the terminal end thereof and without any flash/mismatch on the tubular part due to mold parting lines. This is accomplished by providing an injection mold having a cavity formed with a cylindrical surface portion which terminates at the groove located to form the lip and a core member removably inserted endwise in the cylindrical portion. This core contains a step area extending radially outward beginning at the tube end and continuing in an axial plane to a point aligning with the full radii of the enlarged lip on the outer tubular surface. The core also has an annular surface located substantially in radial alignment with the groove in the mold. This annular surface is provided with alternating substantially V-shape grooves and projections so that the annular surface is of generally saw tooth shape when viewed from the end of the core.

A molten plastic material, such as glass filled nylon, is injected into the cavity so that it extends into the cylindrical portion and around the core member, including the annular saw tooth shape surface. The core member is then axially withdrawn from the cylindrical portion of the mold cavity after the plastic material in the cylindrical portion has solidified enough to retain its tubular shape, but before it has completely cooled, to thereby enable the plastic material to shrink radially inwardly away from the cylindrical surface during further cooling.

Thereafter, the cylindrical surface portion of the injection mold is moved in an axial direction relative to the tubular shape plastic material to withdraw the tubular shape from the cylindrical portion, with the tubular shape deflecting enough to have the mold clear the enlarged lip.

The result is a molded part that can be assembled with other more fragile parts, such as hoses without risking damage to the hoses due to the sharp flash/mismatch on the molded part. In addition, the resulting saw tooth shape of the inner surface of the terminal end of the tubular portion prevents the build up of internal stresses in the tubular portion tending to distort the tubular portion. As a result the tubular portion will retain its desired roundness.

Further objects, features and advantages of the invention will become apparent from a consideration of the following description and the appended claims when taken in connection with the accompanying drawing in which:

FIG. 1 is a fragmentary sectional view of injection mold apparatus for forming the improved part of this invention;

FIG. 2 is a fragmentary detail view of a portion of the apparatus shown in FIG. 1 showing the injection molded part in a partially cooled condition and with the core withdrawn from the tubular portion of the part;

FIG. 8 is an enlarged perspective view of the tubular portion of the finished part shown in FIG. 4; and FIG. 9 is a fragmentary enlarged perspective view of a grooved tubular portion of the part shown in FIG. 8.

Figure 4:
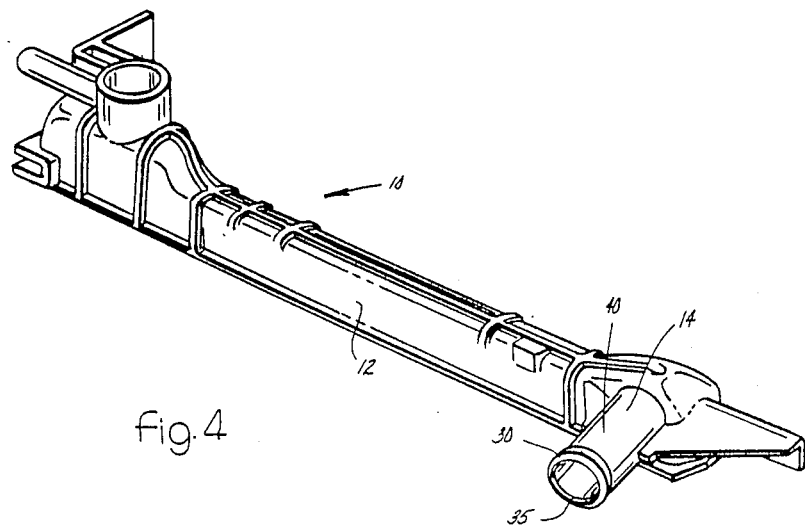
FIG. 4 is a perspective view of the finished part.

The part formed according to the method of this invention, indicated generally at 10, is illustrated in FIG. 4 as a cover for a vehicle radiator consisting of an elongated hollow body member 12 having a tubular portion or wall 14 at one end for attaching a hose (not shown) to the radiator cover 10.

Figure 3:
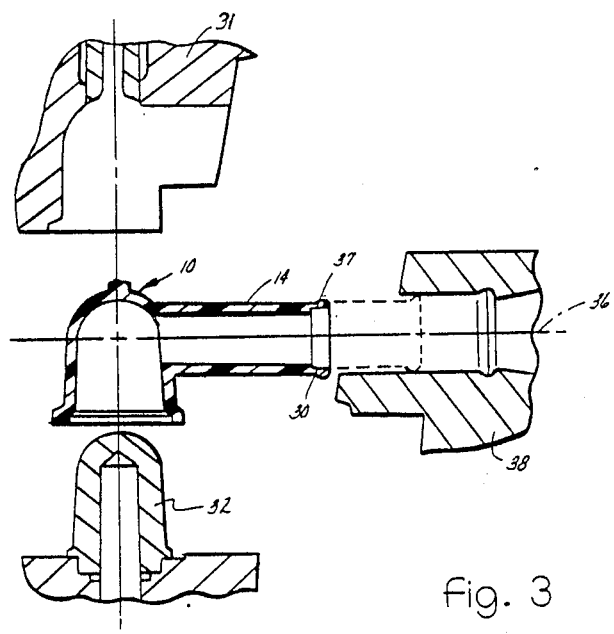
FIG. 3 is a sectional view of the mold apparatus showing the molded part fully removed from the injection mold.

The cover 10 is formed in injection mold apparatus 16 illustrated in FIGS. 1, 2 and 3. The apparatus 16 includes an injection passage 18 through which molten plastic is injected into the mold cavity 20. A core 22 extends into the cavity 20 so as to cooperate with the cylindrical surface 24 therein to form an annular passage 26 of a size and shape to form the tubular portion 14.

As shown in FIGS. 1 and 2, the axially outer end of the cylindrical surface 24 terminates in an annular groove 28 of a shape to form an annular hose retention lip 30 on the tubular portion 14. Two parts 31 and 32 of the mold apparatus 16 are of a complementary shape to form the outlet body 12.

The core 22 has an enlarged step section 33 located in radial alignment with the grooves 28 to cause a thinning of the wall which forms the lip 30, and form an internal shoulder 35 in the tubular portion 14.

In the use of the mold apparatus, molten plastic 34, such as nylon containing glass fibers, is injected into the mold cavity 20 through the inlet passage 18. Any suitable thermoplastic polymer can be used in the process of this invention to manufacture the part 10. Examples of polymers that can be used in the process of this invention are high density polyethylene, high impact polystyrene, polypropylene, polycarbonate, nylon 66–33% glass filled, and other thermoplastics which will retain their shape shortly after injection molding and which shrink when they cool. The molten plastic is injected into the cavity 20 so as to form the plastic tubular portion 14, as shown in FIG. 2.

Promptly after the cavity 26 has been filled with plastic, the core 22 is withdrawn in a direction along the axis 36 of the core 22 and the tubular portion 14 so that the core 22 is in a clearance relation with the tubular portion 14 as shown in FIG. 2.

As the tubular portion 14 continues to cool, it shrinks away from the cylindrical surface 24, as illustrated in FIG. 2, so that it is in a clearance relation with the surface 24. The portion 38 of the mold apparatus 16 that forms the surface 24, is then withdrawn along the same axis 36, as shown in FIG. 3, with the step 33 on the core 22 causing a thinning of the portion 37 of the tubular wall that terminates in the lip 30. The reduced thickness of the wall portion 37 enables the lip 30 to deflect inwardly enough to clear the surfac 24 shown in FIG. 2.

The mold parts 31 and 32 are then separated (FIG. 3) and the part 10 is removed. The result is a molded part 10 in which the tubular portion 14 has a continuous smooth cylindrical outer surface which is without any flange projections or protrusions corresponding to the gaps between mating mold parts. The external surface 40 of the tubular portion 14 is uniformly smooth so that when a relatively fragile fluid carrying tube is telescoped over the tubular portion 14 and retained thereon by the lip 30, it will not be damaged over a prolonged service life.

A specific example of the process is as follows:

| MATERIAL: | |
|---|---|
| 33% glass filled type 66 Nylon | |
| Melting Point | 250–265° C. |
| Glass Fiber Content | 30.0–35.0% |
| Specific Gravity | 1.38–1.42 |
| Tensile Strength - PSI | 25,000 Min. |
| Flexural Strength - PSI | 1,100,000 Min. |
| PROCESS PARAMETERS: | |
| Press Size | 450 Ton |
| Barrell Temp. Rear | 558° F. |
| Barrell Temp. Center | 563° F. |
| Barrell Temp. Front | 570° F. |
| Barrell Temp. Nozzle | 544° F. |
| Injection Pressure 1st | 1000# |
| Injection Pressure 2nd | 600# |
| Back Pressure | 50# |
| Screw Speed | Medium Range |
| MOLD COOLING: | |
| Front Cavity | 120° F. |
| Slides | 120° F. |
| Seamless Core | 90° F. |
| CYCLE TIMES: | |
| Ram Time | 12 sec. |
| Booster Time | 4 sec. |
| Mold Close Time | 24 sec. |
| Screw Pull Back | 0.42 sec. |
| Injection Fill Time | 5.5 sec. |

Core 22 is withdrawn 15 seconds before molds open.

Figure 5:
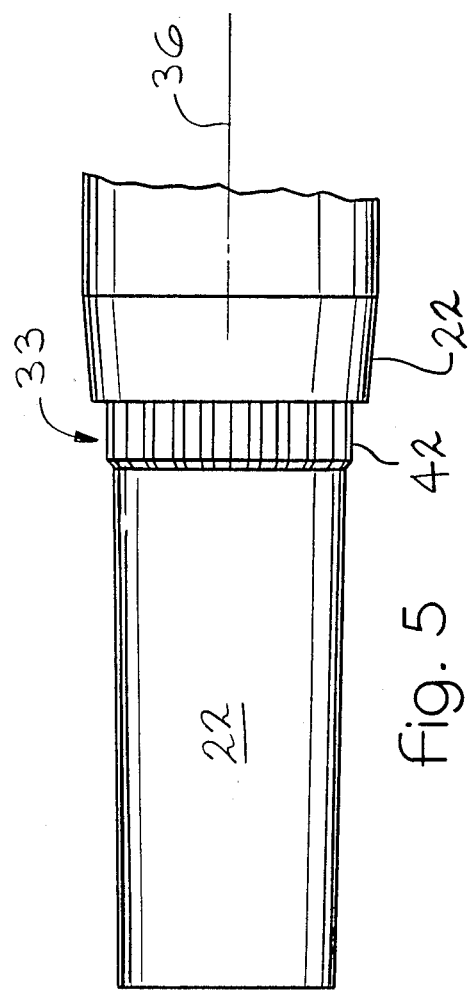
FIG. 5 is an enlarged fragmentary elevational view of an end portion of the core.
Figure 7:
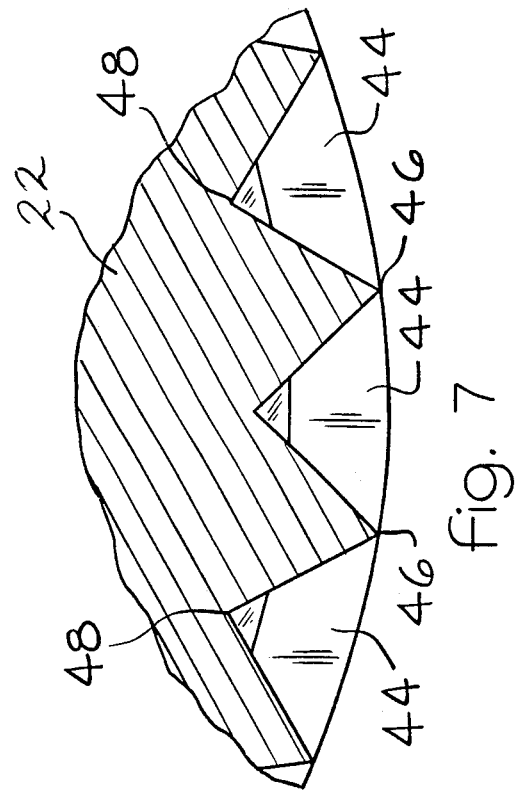
FIG. 7 is a fragmentary sectional view of the grooved core part as seen from substantially the line 7—7 in FIG. 6.
Figure 6:
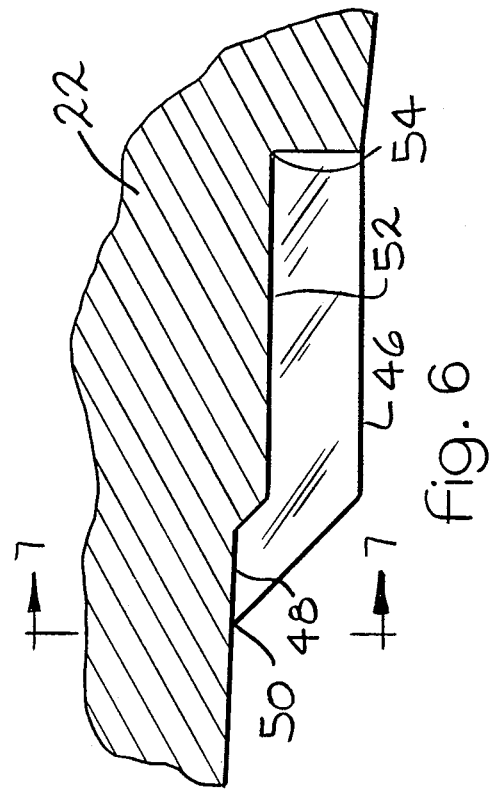
FIG. 6 is an enlarged fragmentary longitudinal sectional view of a grooved part of the core portion shown in FIG. 5.

As shown in FIGS. 5–7, the step section 33 of the core 22 is a radially outwardly extending section of annular shape that has an outer surface 42 consisting of alternating grooves 44 and ridges 46 that are symmetrical with respect to the axis 36. The grooves 44 are of generally V-shape terminating in sharp lines 48 at their ends 50 but being of truncated shape and terminating in flat surfaces 52 at their ends 54.

As a result of the configuration of the core section 33, the tubular portion 14 of the molded part 10 is formed with an annular inner surface portion 56 (FIG. 8) at the terminal end 58 of the tubular portion 14 which is of a non-continuous shape consisting of alternating grooves 60 and ridges 62 corresponding to the shape of the ridges 46 and grooves 44, respectively on the core 22. The ridges 62 have sharp edges 64 at their inner ends and flat edges 66 at their outer ends for safety purposes. The surface portion 56 is discontinuous in nature to insure even and uniform shrinking of the terminal end of the tubular portion 14 during cooling of the part 10 to insure roundness of the tubular portion 14 and thus enhance its use as a hose support which will not leak.

The grooves 60 and ridges 62 are thus symmetrically arranged in the tubular portion 14, appearing as a saw tooth shape, to insure uniform shrinkage of the hose supporting end of the tubular portion 14 during cooling of the molded part 10.

From the above description, it is seen that this invention provides an improved radiator outlet 10, or other suitable part, having the round tubular portion 14 which has a smooth continuous outer surface 40 and includes the lip 34 retaining a hose thereon. Such a part has obvious advantages over similar parts that are burdened with the usual projections corresponding to the spaces between mating mold parts.

What is claimed is:

1. The method of forming a plastic part having a tubular portion with an internal surface at a terminal end thereof having alternating ridges and grooves so as to eliminate a continuous inner surface at the terminal end of the tubular portion and thereby form a substantially symmetrical saw tooth shape to insure roundness of the tubular portion at the terminal end:

(a) providing an injection mold having a cavity formed with a cylindrical surface portion having an outer end section and a core member removably inserted in said cylindrical portion and configured to be in a spaced relation with said cylindrical surface portion, said core member having an annular outer surface portion formed of alternating ridges and grooves when said core member is inserted in said cylindrical portion to assemble said mold, (b) injecting a molten plastic material into said cavity so that the material extends into said cylindrical portion and around said core member, (c) withdrawing said core member from said cylindrical portion along a line extending axially of said cylindrical portion after the plastic material in said cylindrical portion has solidified enough to retain its tubular shape and before it has completely cooled to thereby enable said plastic material to shrink radially inwardly away from said cylindrical surface;

(d) thereafter withdrawing said tubular shape form said cylindrical portion in a direction axially of said tubular shape; and (e) cooling the part to room temperature, the symmetrical discontinuous inner surface of said tubular portion at the terminal end of the part insuring an even shrinking of said tubular portion at said terminal end to thereby insure the roundness of said tubular portion at said terminal end.

* * * * *